US011060624B2

(12) United States Patent
Czechowski

(10) Patent No.: US 11,060,624 B2
(45) Date of Patent: Jul. 13, 2021

(54) VALVE

(71) Applicant: Goodrich Corporation, Charlotte, NC (US)

(72) Inventor: Kamil Czechowski, Wroclaw (PL)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 16/560,076

(22) Filed: Sep. 4, 2019

(65) Prior Publication Data
US 2020/0096123 A1   Mar. 26, 2020

(30) Foreign Application Priority Data
Sep. 21, 2018 (EP) .................... 18461610

(51) Int. Cl.
F16K 17/16 (2006.01)
F16K 17/40 (2006.01)
F16K 31/56 (2006.01)
B63C 9/19 (2006.01)
B60C 29/00 (2006.01)

(52) U.S. Cl.
CPC ............ F16K 13/04 (2013.01); F16K 31/56 (2013.01); B63C 9/19 (2013.01); B63C 9/24 (2013.01)

(58) Field of Classification Search
CPC . F16K 13/04; F16K 31/56; B63C 9/19; B63C 9/24
USPC ............. 137/68.19, 68.23, 170, 226, 489.5; 220/239, 258.4, 261; 280/728.1, 737
See application file for complete search history.

(56) References Cited

U.S. PATENT DOCUMENTS 2,653,602 A * 9/1953 Smoot .................. A61M 5/30
  604/68
3,017,907 A * 1/1962 Quail .................. B63C 9/24
  141/197

(Continued)

FOREIGN PATENT DOCUMENTS

EP   0155407 A2   9/1985
WO   9602420 A1   2/1996

OTHER PUBLICATIONS

Extended European Search Report for International Application No. 18461610.0 dated Feb. 27, 2019, 12 pages.

Primary Examiner — Minh Q Le
(74) Attorney, Agent, or Firm — Cantor Colburn LLP

(57) ABSTRACT

A valve includes a valve body having an inlet for fluid communication with a space or source containing pressurised gas, and at least one outlet. A membrane is arranged between the inlet and the at least one outlet. A membrane puncturing element is arranged for movement between a retracted, inoperative position and an extended position in which it punctures the membrane. An actuating piston is operatively coupled to the membrane puncturing element for moving the membrane puncturing element between its retracted and its extended positions, the actuating piston being received in a piston bore of the valve body. The valve body also includes a cartridge receiving chamber for receiving a sealed actuating gas cartridge. A cartridge puncturing device is provided for puncturing the actuating gas cartridge. An actuating gas flow passage communicates actuating gas released from the actuating gas cartridge to the actuating piston bore upon puncturing the actuating gas.

16 Claims, 5 Drawing Sheets

(56) References Cited

U.S. PATENT DOCUMENTS

| | | | | |
|---|---|---|---|---|
| 3,127,624 | A * | 4/1964 | Kubit | B63C 9/24 441/95 |
| 4,024,440 | A * | 5/1977 | Miller | B63C 9/24 361/251 |
| 4,083,187 | A | 4/1978 | Nagashima | |
| 4,482,081 | A * | 11/1984 | Meggs | B63C 9/24 222/5 |
| 4,498,605 | A * | 2/1985 | Mackal | B63C 9/24 222/5 |
| 4,500,014 | A | 2/1985 | Zimmerly | |
| 4,606,384 | A | 8/1986 | Neukomm | |
| 4,687,451 | A * | 8/1987 | Chen | B63C 9/24 441/100 |
| 4,768,128 | A * | 8/1988 | Jankowiak | B63C 9/24 361/251 |
| 4,887,591 | A * | 12/1989 | Okumura | A62B 7/04 128/205.21 |
| 5,026,310 | A * | 6/1991 | Mackal | B63C 9/24 441/92 |
| 5,064,413 | A * | 11/1991 | McKinnon | A61M 5/30 604/70 |
| 5,643,030 | A * | 7/1997 | Brown | B63C 9/24 116/277 |
| 5,653,191 | A | 8/1997 | Calhoun et al. | |
| 6,089,403 | A | 7/2000 | Mackal | |
| 6,123,227 | A | 9/2000 | Umeda | |
| 6,260,570 | B1 | 7/2001 | Wass et al. | |
| 7,547,293 | B2 * | 6/2009 | Williamson | A61M 5/30 604/70 |
| 7,654,983 | B2 * | 2/2010 | De La Serna | F16K 17/30 604/141 |
| 7,703,640 | B1 | 4/2010 | Hollars et al. | |
| 7,744,563 | B2 * | 6/2010 | Landau | A61M 5/2053 604/68 |
| 9,601,222 | B2 * | 3/2017 | Roit | G21D 1/02 |
| 2001/0004682 | A1 * | 6/2001 | Weston | A61M 5/30 604/72 |
| 2014/0020791 | A1 * | 1/2014 | Anderson | B63C 9/24 141/114 |
| 2015/0010341 | A1 * | 1/2015 | Fricke | A61B 90/50 403/90 |
| 2015/0166155 | A1 | 6/2015 | Tseng | |

* cited by examiner

VALVE

FOREIGN PRIORITY

This application claims priority to European Patent Application No. 18461610.0 filed Sep. 21, 2018, the entire contents of which is incorporated herein by reference.

TECHNICAL FIELD

The present disclosure relates to valves, and in particular but not exclusively to inflation valves.

BACKGROUND

Inflation valves are used in a wide range of applications, for example in inflating emergency evacuation slide systems for aircraft, life rafts and other inflatable devices.

One valve used in these applications is disclosed in U.S. Pat. No. 6,260,570 B. Inflation gas is released from a pressurised gas source though the valve which comprises a rupturable membrane. The membrane is ruptured by a spring loaded puncturing needle which is operated by a pull cable which releases a trigger ball which in turn releases the needle which punctures the membrane under the force of its spring. This type of release mechanism may, however, be sensitive to spring relaxation

SUMMARY

From one aspect, the disclosure provides a valve which comprises a valve body comprising an inlet for fluid communication with a space or source containing pressurised gas, and at least one outlet. A membrane is arranged between the inlet and the at least one outlet. A membrane puncturing element is arranged for movement between a retracted, inoperative position and an extended position in which it punctures the membrane. An actuating piston is operatively coupled to the membrane puncturing element for moving the membrane puncturing element between its retracted and its extended positions. The actuating piston is received in a piston bore of the valve body. The valve further comprises a cartridge receiving chamber for receiving a sealed actuating gas cartridge and a cartridge puncturing device for puncturing the actuating gas cartridge. An actuating gas flow passage communicates actuating gas released from the actuating gas cartridge to the actuating piston bore upon puncturing the actuating gas cartridge for moving the actuating piston and thus moving the membrane puncturing element from its retracted to its extended position.

The actuating gas flow passage may comprise an annular plenum extending around the axis of the actuating piston bore. At least one feed passage may extend from the annular plenum to the actuating piston bore.

Various embodiments may include a plurality of feed passages circumferentially spaced around the axis of the actuating piston bore.

The plurality of feed passages may be circumferentially equi-spaced around the axis of the actuating piston bore.

The actuating piston may be biased into contact with an end of the actuating piston bore by a biasing spring.

The actuating gas flow passage may enter the actuating piston bore adjacent one end of the actuating piston bore.

A face of the actuating piston facing the end of the actuating piston bore may be crowned so as to form an annular chamber between the actuating piston and the end of the actuating piston bore and the actuating gas flow passage may be connected to the annular chamber.

The end of the actuating piston bore may be formed by a plug mounted within an opening of the valve body, The cartridge receiving chamber may be arranged transversely to the axis of the actuating piston.

The valve body may be additively manufactured.

The actuating gas cartridge puncturing device may comprise a spring loaded needle.

The valve may further comprise an actuating gas cartridge arranged in the cartridge receiving chamber. The actuating gas may be carbon dioxide.

The disclosure also provides an inflation device comprising a valve in accordance with the disclosure and a source of inflating gas, for example a cylinder of inflating gas, coupled to the inlet of the valve.

The disclosure also provides a method of inflating an inflatable device comprising:

puncturing a membrane arranged in a flow path between a source of inflating gas and the inflatable device by moving a membrane puncturing element from a retracted, inoperative position, to an extended, rupturing position, the movement of the membrane puncturing element to the extended position being effected by releasing actuating gas from an actuating gas cartridge (into an actuation piston bore which receives an actuating piston to which the membrane puncturing element is operatively coupled.

BRIEF DESCRIPTION OF DRAWINGS

An embodiment of the disclosure will now be described, by way of example only, with reference to the accompanying drawings in which.

DETAILED DESCRIPTION

Figure 1:
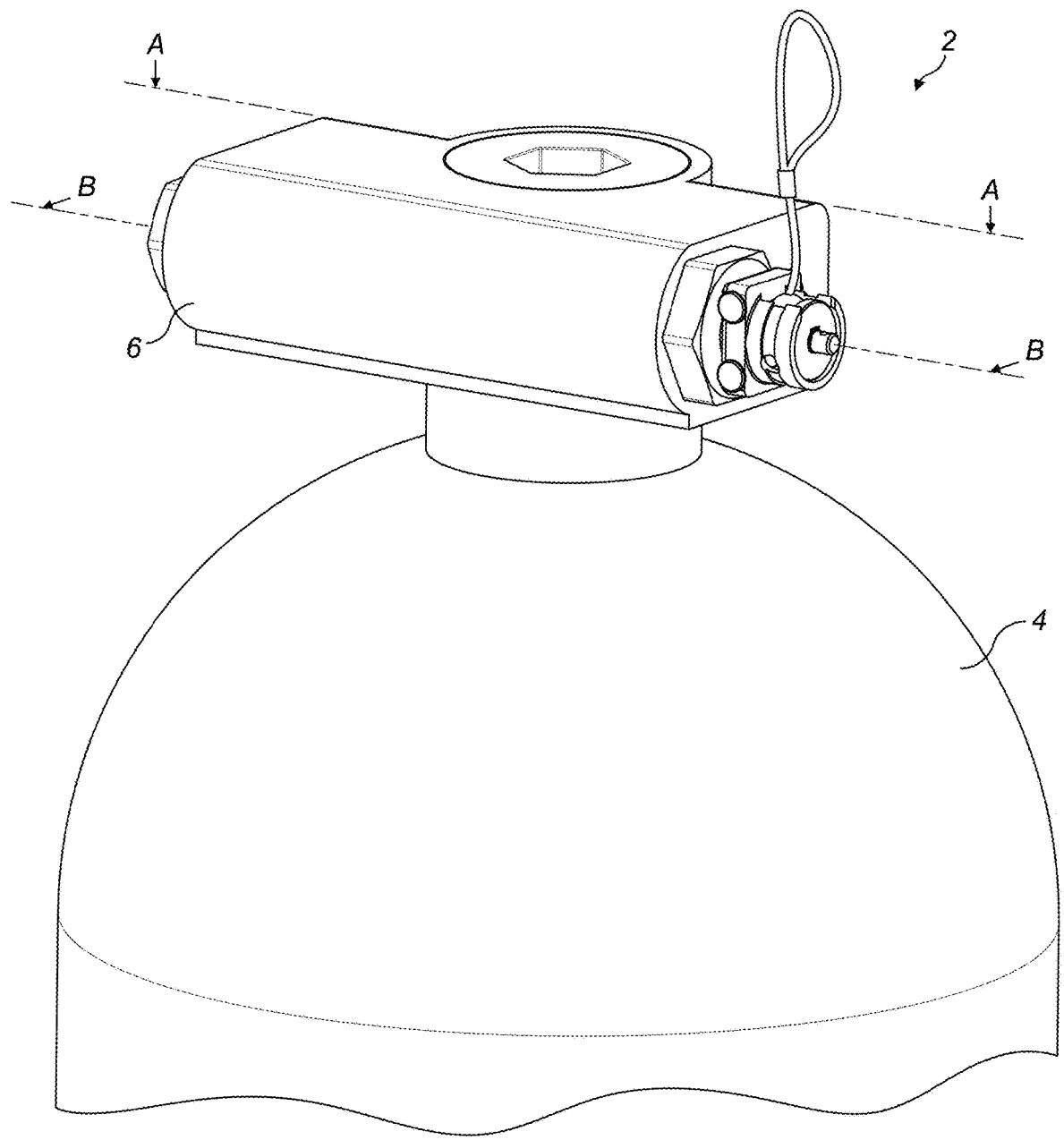
FIG. 1 shows a perspective view of part of an inflation device comprising an inflation valve in accordance with the disclosure.

With reference to FIG. 1, an inflation device 2 in accordance with the disclosure comprises a source of inflating gas 4 and an inflation valve 6 mounted to the source of inflating gas 2. In the embodiment illustrated, the source of inflating gas is a cylinder containing pressurised gas, for example carbon dioxide. The inflation valve 4 selectively communicates inflation gas from the cylinder 4 to a device (not shown) to be inflated.

Figure 2:
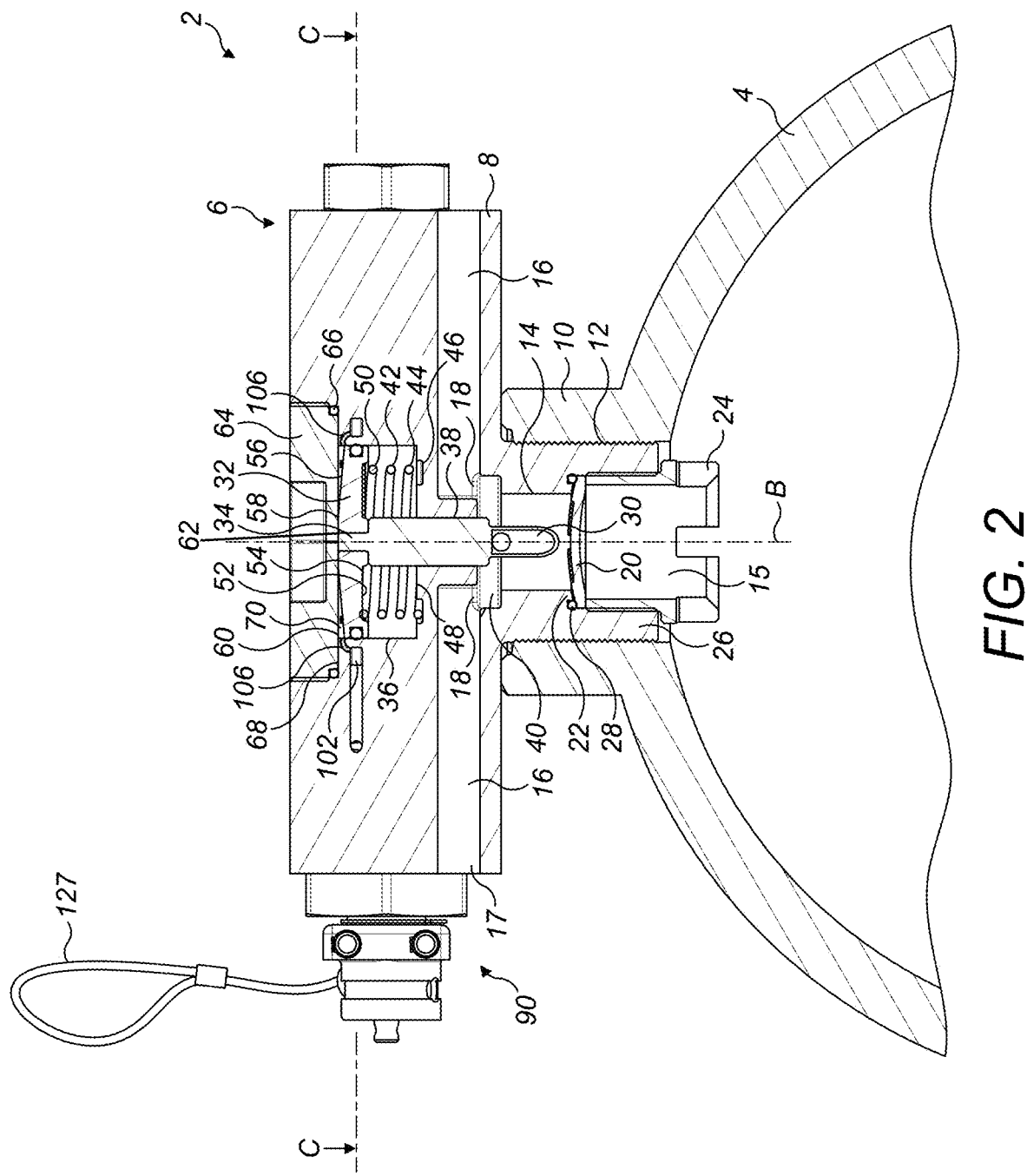
FIG. 2 shows a vertical section along line A-A of FIG. 1.

As can be seen from FIG. 2, the inflation valve 6 comprises a valve body 8 which in this embodiment is mounted to a neck portion 10 of the inflating gas cylinder 2 by means of a threaded connection 12.

The valve body 8 comprises an inlet passage 14 having an inlet 15 for fluid communication with the cylinder 4, and at least one outlet passage 16 having an outlet 17, in this embodiment, two outlet passages 16, for fluid communication with the device to be inflated. In some embodiments, the outlet passages 16 may be connected to the device through respective pipes (not shown) or they may simply exhaust directly into the device. For example in some embodiments, the outlet passages 16 may be threaded for connection to hoses or other pipes conducting the inflation gas to the device. Also, while two outlet passages 16 are shown, one of the outlet passages 16 may be plugged to provide just a single outlet for inflation gas.

The inlet passage 14 and the outlet passages 16 are fluidly connected by passages 18 defined within the valve housing 8 as will be described further below.

A rupturable membrane 20, for example a metallic disc, is arranged in the inlet passage 14 between the inlet 15 and the at least one outlet passage 16. In this embodiment, the rupturable membrane 20 is received on a shoulder 22 of the inlet passage 14 and retained in position on the shoulder 22 by an externally threaded annular retainer 24 which engages an internally threaded portion 26 of the inlet passage 14. A seal 28, for example an O-ring seal 28, may be received between the shoulder 22 and the rupturable membrane 20.

The inflation valve 4 further comprises a membrane puncturing element 30. In the illustrated embodiment, the membrane puncturing element 30 is a hollow needle, but in other embodiments, the membrane puncturing element 30 may be a pin, spike or the like. The membrane puncturing element 30 is, as will be described further below, arranged for movement between a retracted, inoperative position and an extended position in which it punctures the rupturable membrane 20.

The membrane puncturing element 30 is coupled to an actuating piston 32 by means of a shaft 34. The actuating piston 32 is received in a piston bore 36 defined in the valve housing 8. A seal, for example an O-ring seal 33 may be provided around the head of the piston 32 to improve sealing of the piston 32 within the piston bore 36. The piston shaft 34 extends through a guide channel 38 which opens into an enlarged diameter bore section 40 of the inlet passage 14. The passages 18 extend between the bore section 40 and the closed ends of the outlet passages 16.

The piston 32 is urged upwardly, away from the rupturable membrane 20, by means of a biasing member 42, in this embodiment a coil spring 42. One end 44 of the spring 42 may, as shown, be located in an annular groove 46 formed in an upwardly facing surface 48 of the piston bore 36. The other end 50 of the spring 42 may, as shown, be received within a recess 52 formed in the lower face 54 of the actuating piston 32.

The upper surface 56 of the actuating piston 32 is, in this embodiment, domed or crowned, i.e. its central region 58 is raised relative to its peripheral region 60. Thus, as shown, the upper surface 56 may in certain embodiments be generally frusto-conical in shape. In other embodiments, the upper surface 56 may be curved or stepped for example.

The piston bore 36 is closed at its upper end 62 by a plug 64. The upper end 62 of the piston bore 36 and the plug may be threaded, as shown. A seal ring 66 may also be provided, as shown, between the piston bore 36 and the plug 64. The lower surface 68 of the plug 64 is generally planar.

In the retracted position of the membrane puncturing needle illustrated in FIG. 2, the actuating piston 32 is biased into contact with the lower face 68 of the plug 64. The effect of the crowning of the upper surface 56 of the actuating piston 32 is that it creates an annular chamber 70 between the upper surface 56 of the actuating piston 32 and the lower surface 68 of the plug 64. This chamber 70 has a maximum height at its periphery, becoming shallower towards the axis B of the actuating piston 32.

Figure 4:
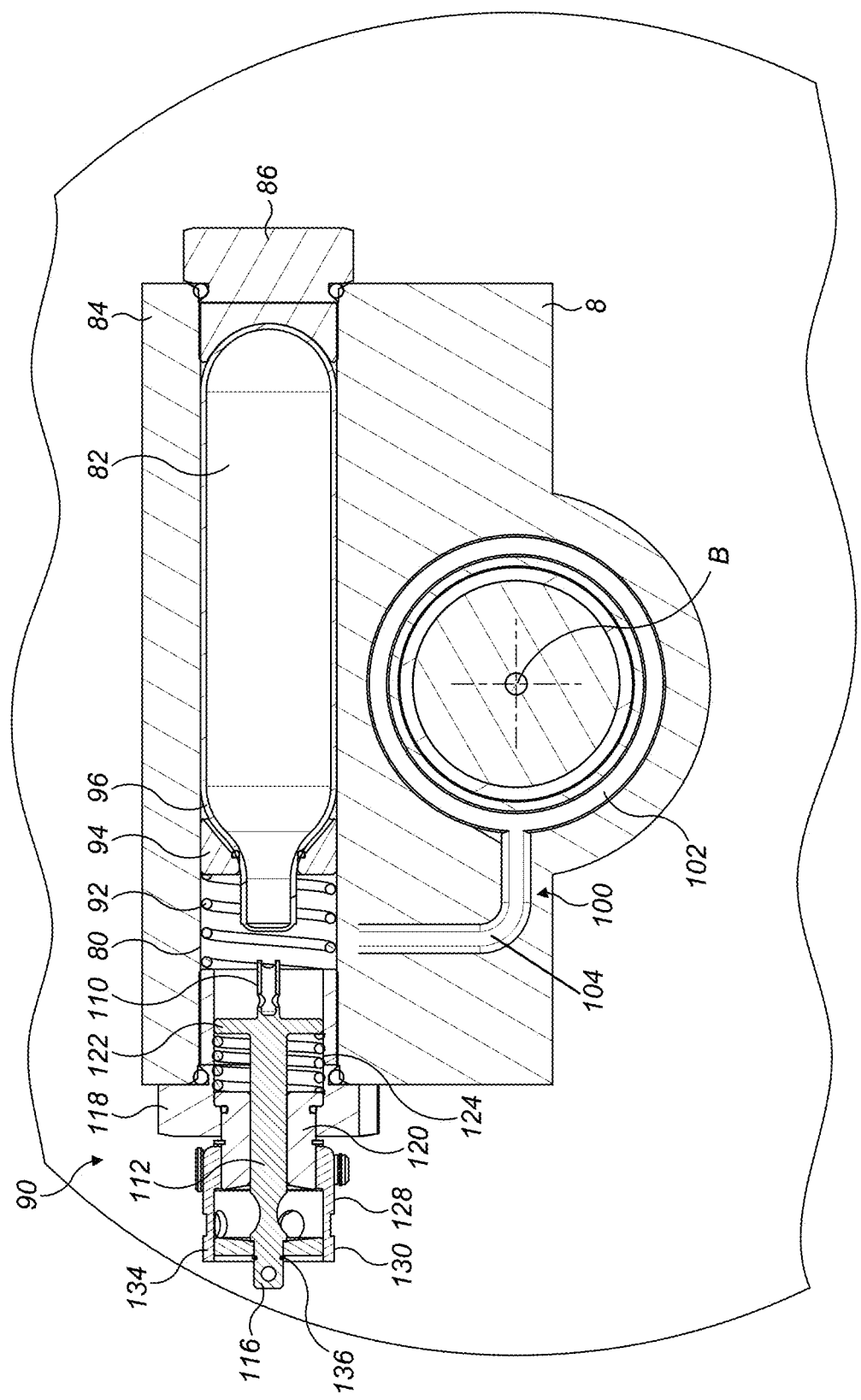
FIG. 4 shows a horizontal cross section along line C-C of FIG. 2.

Turning now to FIG. 4, the valve body 8 further comprises an actuating gas cartridge receiving chamber 80. In this embodiment, the actuating gas receiving chamber 80 is arranged with its longitudinal axis A transversely to the axis B of the actuating piston 32, in particular perpendicular thereto. In other embodiments, however, the actuating gas cartridge receiving chamber 80 may be arranged such that its axis A is arranged at another orientation relative to the actuating piston axis B, for example generally parallel thereto.

The actuating gas cartridge receiving chamber 80 receives an actuating gas cartridge 82. This cartridge 82 may be a carbon dioxide cartridge, for example. Such cartridges, which may comply with standard SAE AS6011, are widely used in inflating devices such as life jackets and are sealed cartridges containing a known mass of gas at a known pressure. For example, the cartridge may be a Type II, 12 gram capacity carbon dioxide bullet.

One end 84 of the actuating gas receiving chamber 80 is closed by a removable plug 86, which allows insertion of the actuating gas cylinder 82 into the actuating gas receiving chamber 80. The other end 88 of the actuating gas receiving chamber 80 is closed by an actuating gas cartridge puncturing device 90 which will be discussed further below. The actuating gas cartridge 82 is biased towards the plug 86 by a spring 92 acting on a collar 94 which engages around the neck 96 of the actuating gas cartridge 82.

An actuating gas flow passage 100 is formed through the valve body 8 for communicating actuating gas released from the actuating gas cartridge 82 to the actuating piston bore 36 upon puncturing the actuating gas cartridge 82, so as to move the actuating piston 32 to move the membrane puncturing element needle 30 from its retracted to its extended position.

Figure 3:
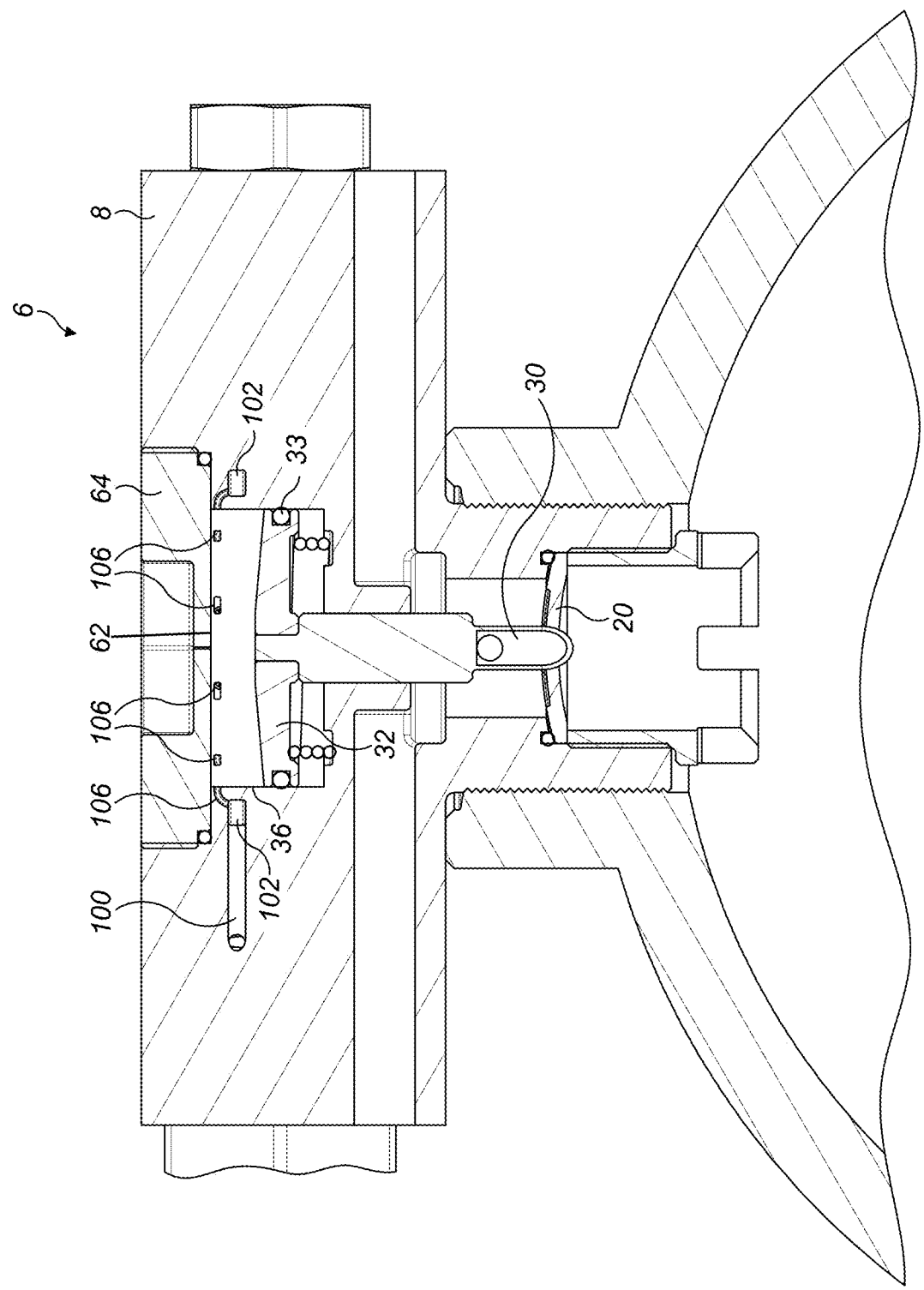
FIG. 3 shows vertical cross section through the inflation valve, corresponding to that of FIG. 2, but with the puncturing needle in an extended position.

The actuating gas flow passage 100 comprises an annular plenum 102 formed around the actuating piston bore 36 and a connecting passage 104 extending between the annular plenum 102 and the actuating gas receiving chamber 80. As can best be seen in FIG. 3, at least one, in this embodiment ten, feed passages 106 extend from the annular plenum 102 to the piston bore 36. The feed passages 106 may be circumferentially spaced around the piston bore 36. In this embodiment, the feed passages 106 are circumferentially equi-spaced around the piston bore 36. An advantage of this particular arrangement is that it allows actuating gas to be evenly distributed about the entire periphery of the actuating piston 32, thereby reducing out of axis forces on the actuating piston 32. In some embodiments, the sum of the cross-section surfaces area of the feed passages shall be not smaller than that of the actuating gas flow passage 100. This helps avoid or mitigates a reduction in the pressure or flow rate of gas into the annular chamber 70.

As can be seem from FIG. 2, the feed passages 106 enter the piston bore 36 at the annular chamber 70 adjacent the upper end 62 of the piston bore 36.

Figure 5:
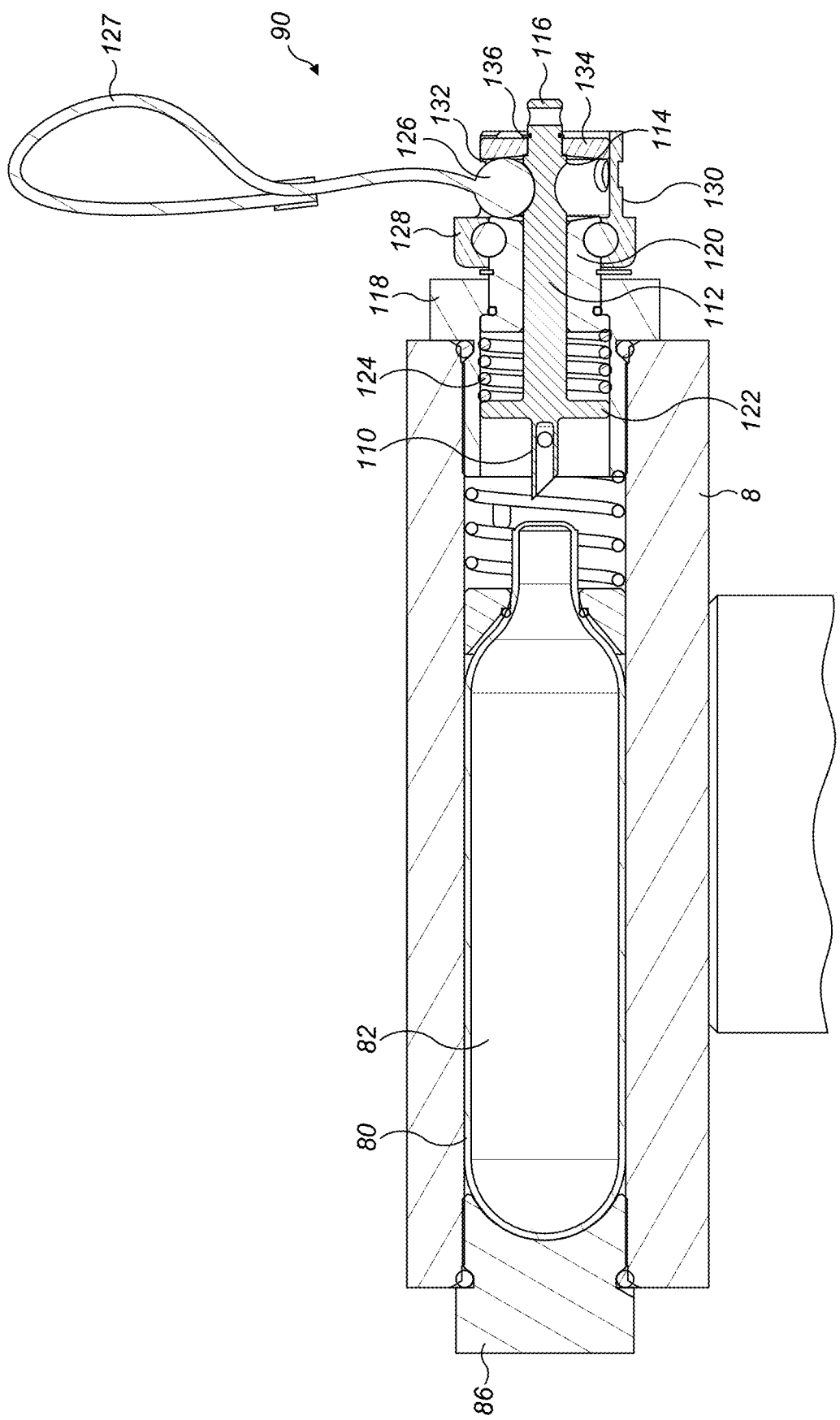
FIG. 5 shows a section along line B-B of FIG. 1.

As discussed above, one end 88 of the actuating gas receiving chamber 80 is closed by an actuating gas cartridge puncturing device 90. Details of this actuating gas cartridge puncturing device 90 can be seen in FIGS. 4 and 5.

In this embodiment, the actuating gas cartridge puncturing device 90 comprises a cartridge puncturing element, for example a needle 110 mounted on a rod 112 having an annular groove 114 formed at an end 116 opposite the cartridge puncturing needle 110. The rod 112 is mounted in an element 118 mounted, for example threadedly mounted, in the end 88 of the actuating gas receiving chamber 80.

The element 118 receives a guide sleeve 120 for guiding the rod 112. The rod 112 has an annular flange 122, and a coil spring 124 is mounted between the flange 122 and the guide sleeve 120 so as to bias the puncturing needle 110 towards the top of the actuating gas cartridge 82. The cartridge puncturing needle 110 is retained in an unextended position by means of a retaining element 126 attached to a strap 127 and engaging in the annular groove 114 in the rod 112.

The retaining element 126 is generally spherical in shape and is received in a housing 128 mounted to the guide sleeve 120. The housing 128 comprises a wall 130 having an opening 132 for receiving the retaining element 126. The retaining element 126 is retained, under the biasing force of the spring 124, between an end of the guide sleeve 120 and a washer 134 which is attached to the end 116 of the rod 112 by means of a circlip 138. The washer 134 is dished, as can be seen most clearly in FIG. 5. This dishing resists the removal of the retaining element 126 from the housing 128 such that the use will have to apply a predetermined force to the strap 127 to release the retaining element 126.

Having described the structure of the inflation valve 6, its mode of operation will now be described.

In the normal, unoperated condition illustrated in FIGS. 1, 2, 4 and 5, the cartridge puncturing needle 110 and the membrane puncturing needle 30 are retracted by virtue of their respective biasing springs 124, 42. When it is desired to inflate the device, the strap 127 is pulled, thereby removing the retaining element 126 from the valve 6. This in turn releases the cartridge puncturing needle 110, which moves under the force of its biasing spring 124 to puncture the tip of the actuating gas cartridge 82.

This releases actuating gas from the actuating gas cartridge 82 which then flows through the flow passage 100 to enter the annular chamber 70 formed at the top of the piston bore 36. The pressure of the actuating gas is sufficiently high to move the actuating piston 32 downwardly against the force of the spring 42, thereby causing the membrane puncturing element 30 to move downwardly and puncture the membrane 20. Inflating gas can then flow from the cylinder 4 through the inlet passage 14 to the outlet passages 16 of the valve 6 and from there to the device to be inflated.

The use of an actuating gas cartridge 82 rather than a spring to operate a membrane puncturing element 30 in embodiments of the disclosure is advantageous in that the operation of the needle is not subject to spring relaxation. As a sealed cartridge is used, a reliable, consistent operating pressure will be produced, providing a reliable, consistent movement of the membrane puncturing element 30. The device is thus essentially maintenance free.

The valve body 8 may be made in a number of ways. In some embodiments, the valve body 8 may be made by an additive manufacturing technique. This is advantageous as it will allow small, intricately shaped passages, such as the feed passage 106 to be formed through the valve body 8. Small passages may allow a low pressure drop between the inflating gas cartridge 82 and the piston bore 36. In other embodiments, the valve body 8 may be machined from a single piece of material or assembled from a number of discrete components.

It will be understood that modifications may be made to the exemplary embodiment described above without departing from the scope of the disclosure.

In some embodiments, for example, the flow passage 100 may be simplified, and a single flow passage 100 may enter the piston bore 36, rather than a plurality of feed passages 106. There may be more or fewer feed passages 106 than those illustrated.

Also, other actuating gas cartridge puncturing devices 90 may be envisaged. For example, a fixed actuating gas cartridge puncturing needle may be provided and the cartridge 82 may be movable within the actuating gas cartridge receiving chamber 80 into contact with the puncturing needle. In other embodiments, the actuating gas cartridge puncturing device 90 may be moved by hand or by an electromagnetic element such as a solenoid.

Also, while the disclosure has been described in connection with inflation devices, the mechanism valve disclosed could be used in other applications where release of a high pressure gas from a source is required. This applies not only to situations where a source of gas is provided for a specific purpose such as for inflating devices as discussed above, but in other systems where a rapid depressurisation of a space is required. In that event, the valve 6 may be installed in a wall or outlet of a space, the puncturing of the membrane 30 releasing gas from the space.

The invention claimed is:

1. A valve comprising:
a valve body comprising an inlet for fluid communication with a space or source containing pressurised gas, and at least one outlet;
a membrane arranged between the inlet and the at least one outlet;
a membrane puncturing element arranged for movement between a retracted, inoperative position and an extended position in which it punctures the membrane;
an actuating piston operatively coupled to the membrane puncturing element for moving the membrane puncturing element between its retracted and its extended positions, the actuating piston being received in a piston bore of the valve body;
a cartridge receiving chamber for receiving a sealed actuating gas cartridge;
a cartridge puncturing device for puncturing the actuating gas cartridge; and
an actuating gas flow passage for communicating actuating gas released from the actuating gas cartridge to the actuating piston bore upon puncturing the actuating gas cartridge for moving the actuating piston and thus the membrane puncturing element from its retracted to its extended position;
wherein the actuating gas flow passage comprises an annular plenum extending around the actuating piston bore, and a plurality of feed passages extending from the annular plenum to the actuating piston bore and circumferentially spaced around an axis (B) of the actuating piston bore.

2. The valve as claimed in claim 1, wherein the plurality of feed passages are circumferentially equi-spaced around the axis (B) of the actuating piston bore.

3. The valve as claimed in claim 1, wherein the actuating piston is biased into contact with an end of the actuating piston bore by a biasing spring.

4. The valve as claimed in claim 3, wherein the end of the actuating piston bore is formed by a plug mounted within an opening of the valve body.

5. The valve as claimed in claim 1, wherein the actuating gas flow passage enters the actuating piston bore adjacent one end thereof.

6. A The valve as claimed in claim 5, wherein the end of the actuating piston bore is formed by a plug mounted within an opening of the valve body.

7. The valve as claimed in claim 1, wherein the face of the actuating piston facing the end of the actuating piston bore is crowned so as to form an annular chamber between the actuating piston and the end of the actuating piston bore, the actuating gas flow passage being connected to the annular chamber.

8. The valve as claimed in claim 7, wherein the end of the actuating piston bore is formed by a plug mounted within an opening of the valve body.

9. The valve as claimed in claim 1, wherein:
the actuating piston is biased into contact with an end of the actuating piston bore by a biasing spring; and
the face of the actuating piston facing the end of the actuating piston bore is crowned so as to form an annular chamber between the actuating piston and the end of the actuating piston bore, the actuating gas flow passage being connected to the annular chamber.

10. The valve as claims in claim 1, wherein the cartridge receiving chamber is arranged transversely to the axis (B) of the actuating piston.

11. The valve as claims in claim 1, wherein the valve body is additively manufactured.

12. The valve as claimed in claim 1, wherein the actuating gas cartridge puncturing device comprises a spring loaded needle.

13. The valve as claims in claim 1, further comprising an actuating gas cartridge arranged in the cartridge receiving chamber.

14. The valve as claimed in claim 13, wherein the actuating gas is carbon dioxide.

15. An inflation device comprising:
a valve as claimed in claim 1; and
a source of inflating gas, for example a cylinder of inflating gas, coupled to the inlet of the valve.

16. A method of inflating an inflatable device using the inflation device of claim 15, the method comprising:
arranging the outlet of the valve in fluid communication with the inflatable device;
puncturing the membrane,
wherein puncturing includes moving the membrane puncturing element from the retracted, inoperative position, to the extended, rupturing position,
wherein the movement of the membrane puncturing element to the extended position is caused by releasing actuating gas from the actuating gas cartridge into the actuation piston bore which receives the actuating piston to which the membrane puncturing element is operatively coupled.

* * * * *